United States Patent [19]

Boucheron et al.

[11] 4,058,653

[45] Nov. 15, 1977

[54] PROCESS FOR THE PREPARATION OF POLYMERS OF BUT-1-ENE

[75] Inventors: Bernard Boucheron, Bethune; Emile Gosset, Lillebonne, both of France

[73] Assignee: Ethylene Plastique, Courbevoie, France

[21] Appl. No.: 395,941

[22] Filed: Sept. 10, 1973

[30] Foreign Application Priority Data

Sept. 14, 1972 France .............................. 72.32647

[51] Int. Cl.² .......................................... C08F 110/00
[52] U.S. Cl. .................................... 526/159; 526/349
[58] Field of Search ................ 260/93.7; 526/159, 349

[56] References Cited

U.S. PATENT DOCUMENTS 3,435,017  3/1969  Natta et al. .......................... 260/93.7

FOREIGN PATENT DOCUMENTS 785,314  10/1957  United Kingdom

OTHER PUBLICATIONS

Krigbaum, W. R., et al., J. Physical Chemistry, 1961, 65, pp. 1984-1991.
Rubin, I. D., "Poly(1-Butene)," (Gordon and Breach, 1968), pp. 11, 14, 16, 19, 40, 68-71, and 99-111.
D. J. Buckley, "Butylene Polymers"-pp. 754-795 in Encyclopedia of Polymer Science & Technology, vol. 2, (1967) Interscience.

Primary Examiner—Joseph L. Schofer
Assistant Examiner—A. L. Clingman

[57] ABSTRACT

The invention provides a process for the preparation of but-1-ene homopolymers or copolymers of but-1-ene containing up to 15% by weight of at least one other α-olefin by the stereo-specific polymerization, using a Ziegler-Natta catalyst, of but-1-ene in a homogeneous reaction mixture. By employing a homogeneous reaction mixture comprising at least 70% by weight of but-1-ene and from 1 to 30% by weight of an inert hydrocarbon solvent which is capable of dissolving at least 100 g/l of an isotactic polybutene it is possible to employ reaction temperatures of from 35° to 55° C., thereby improving the quality of the resulting but-1-ene polymer while avoiding precipitation of polymer during the course of the reaction.

5 Claims, 1 Drawing Figure

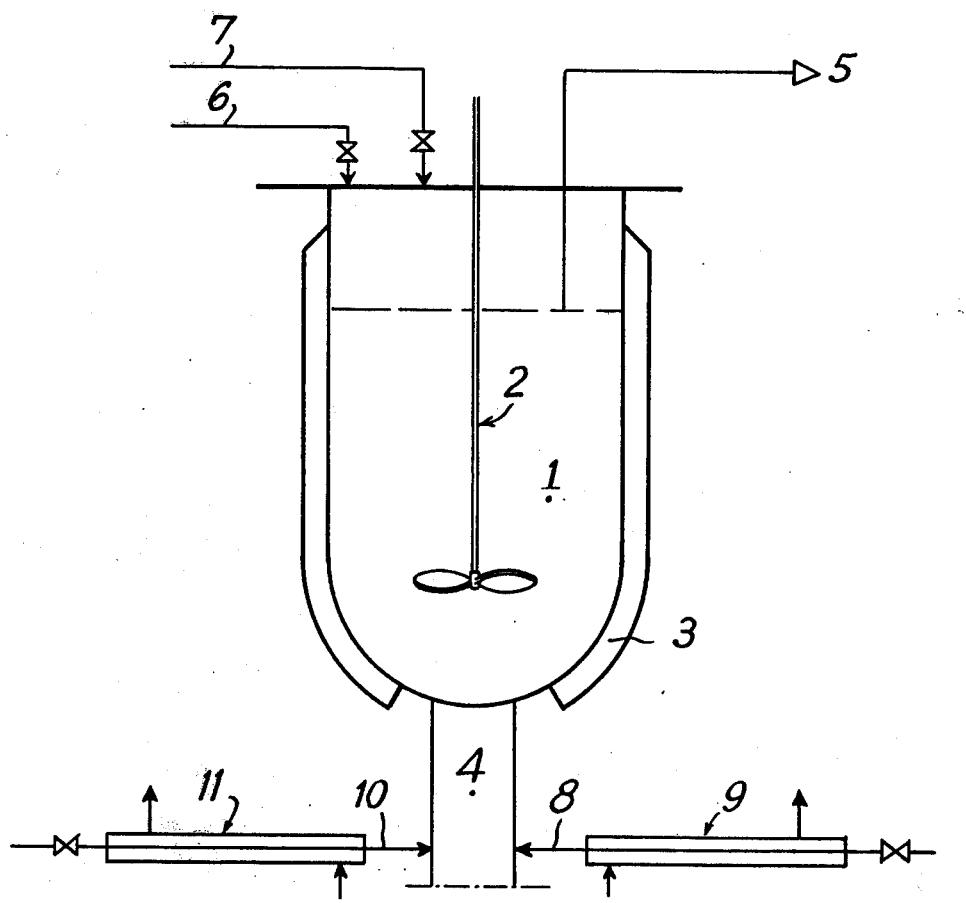

PROCESS FOR THE PREPARATION OF POLYMERS OF BUT-1-ENE

The present invention relates to a process for the preparation of polymers of but-1-ene.

Catalysts of the Ziegler-Natta type make possible the stereospecific polymerisation and copolymerisation of α-olefins. Thus, for example, using such catalysts it is possible to polymerise but-1-ene to give isotactic polybutene homopolymers and to copolymerise but-1-ene with at least one other α-olefin to give but-1-ene copolymers containing up to 15% by weight of units derived from the α-olefin comonomer.

The polymerisation of but-1-ene may be carried out in a homogeneous reaction mixture, that is to say in a reaction mixture in which the polymer formed is soluble. In order to carry out a process in a homogeneous reaction mixture it is possible to use as the solvent, a hydrocarbon or a mixture of hydrocarbons or even but-1-ene monomer. If it is desired to polymerise very pure monomer (at least 99% pure) the cloud point of the homogeneous medium (the temperature at which a polymer precipitate becomes visible) is approximately 43° C. Perfect thermostatic control of an industrial reactor cannot generally be achieved and regions occur in which the temperature is below the average. If in these regions the temperature is below the cloud point there is a tendency for the localised formation of gelled or precipitated polymer to occur. This polymer can clog pipelines or form stagnant accumulations which develop very high and undesirable molecular weights. In order to avoid these operating difficulties polymerisation temperatures considerably higher than the cloud point have been employed, for example 65° to 80° C. However, these high temperatures are not suitable for producing isotactic polymers.

The present invention provides a process for the preparation of but-1-ene homopolymers or copolymers of but-1-ene containing up to 15% by weight of units derived from at least one other α-olefin which process comprises polymerising or copolymerising but-1-ene in the presence of a stereospecific Ziegler-Natta catalyst and in a homogeneous reaction mixture at a temperature of from 35° to 55° C., wherein the reaction mixture contains at least 70%, preferably at least 85%, by weight of but-1-ene and from 1 to 30%, preferably 2 to 15%, by weight of at least one inert hydrocarbon solvent in which solvent an isotactic polybutene (as hereinafter defined) having a reduced viscosity (measured at 135° C. on a solution, having a concentration of 1 g/dl, of polybutene in decalin) of at most 5 dl/g is soluble to the extent of at least 100 g/l at 50° C.

(When used in this specification the term "isotactic polybutene" denotes a polybutene more than 90% by weight of which is insoluble in boiling ethyl ether.)

The proportion of inert hydrocarbon solvent should not exceed 30% by weight because the solvents are much less volatile than but-1-ene and consequently are much more difficult to separate from the polybut-1-ene formed than is but-1-ene itself.

The but-1-ene may be introduced into the polymerisation reaction mixture in the form of a cut of aliphatic hydrocarbons of 4 carbon atoms, the so-called $C_4$ cut, which contains (in addition to but-1-ene) but-2-ene, butane, isobutane and small amounts of $C_3$ and $C_5$ hydrocarbons, but which contains no isobutene, alkynes or diolefins (especially 1,3-butadiene). The $C_4$ cut should contain at least 75%, and preferably at least 90%, of but-1-ene. The but-1-ene may also be introduced into the polymerisation reaction mixture in the form of highly concentrated, pure or practically pure product containing at least 95%, preferably at least 99%, of but-1-ene.

The process of the present invention can be applied to the preparation of but-1-ene homopolymers or to the preparation of copolymers of but-1-ene containing up to 15% by weight of units derived from at least one other α-olefin such as ethylene or propylene.

The catalysts of the Ziegler-Natta type which are used in the process of the invention are well known and have been described in numerous publications. In general they comprise, as one component, an organometallic compound, and, as a second component, a transition metal halogen compound. The organometallic compound preferably is an organo-aluminium compound such as a trialkylaluminium, for example triethylaluminium, or a dialkylaluminium halide, for example diethylaluminium chloride, dipropylaluminium chloride and dibutylaluminium chloride. The transition metal halogen compound is a compound of a metal of Group IVa, Va or VIa of the Periodic Table, preferably of titanium, for example violet titanium trichloride.

The catalyst can be employed in conjunction with known additives (for example complexing agents such as Lewis bases which promote the stereospecificity of the catalyst) and the polymerisation can be carried out in the presence of known transfer agents (for example hydrogen or zinc derivatives).

Hydrocarbons which can be used as the inert solvents in accordance with the invention include benzene, toluene, xylenes and saturated cyclic hydrocarbons such as cyclohexane and methylcyclohexane. Methylcyclohexane is especially preferred for use because of its intrinsic properties, particularly its non-toxicity and its very low freezing point. Toluene is also a very valuable solvent. The solvents should be inert with respect to the polymerisation reaction and are, of course, excellent solvents for isotactic polybut-1-ene.

The polymerisation reaction of the invention is carried out at from 35 to 55° C. The presence of the inert hydrocarbon solvent in the polymerisation reaction mixture makes it possible to obtain a but-1-ene polymer which is of good quality and high isotacticity, and to increase the polymerisation rate constant. The inert solvent also makes it possible to work in a homogeneous reaction mixture at a lower temperature than that which can be used in the absence of the solvent, and this leads to the production of a polymer which is more homogeneous and has a molecular weight corresponding to greater crystallinity.

The inert solvent can be introduced into the reaction mixture either directly or as a carrier for one of the components of the catalyst, and especially the transition metal halogen compound. This latter method of introduction is particularly valuable when titanium trichloride is used (violet titanium trichloride can contain aluminium trichloride crystallised with it to form a common structure) since this is a solid which is soluble neither in the reaction mixture nor in the inert solvent. By introducing titanium trichloride into the reactor suspended in the inert solvent the handling of the solid is made easier and harmful premature contact between the titanium trichloride and the monomer is avoided.

The polymerisation reaction can be carried out according to the invention either batchwise or, as is preferred, continuously.

The following Examples and Comparative Examples serve to illustrate the invention.

COMPARATIVE EXAMPLE 1

The reactor used is an autoclave of capacity 620 ml (length 220 mm and diameter 60 mm), equipped with a double heating jacket, a pressure lock for introducing various reagents and thermocouples for recording temperatures. The autoclave can be shaken by pivoting about a radial axis and the two ends are provided with glass windows for examining the reaction mixture. The reaction is carried out in the absence of oxygen and moisture by flushing the autoclave with nitrogen gas.

4 Millimols of diethylaluminium chloride in 2 ml of iso-octane, 1 millimol of titanium trichloride Stauffer AA in 23 ml of iso-octane, 310 ml of pure but-1-ene and 75 ml of iso-octane are introduced into the autoclave. The mixture is shaken and heated to 45° C. and polymerisation is carried out for 3 hours. The mixture is heated rapidly to 65° C. and the catalyst is deactivated by the addition of 6 ml of isopropanol followed by washing with water. 24 of polybut-1-ene are recovered by releasing the pressure in the autoclave. In this experiment it is found by observations through the windows of the autoclave and by monitoring the temperature that the reaction mixture is not homogeneous and polybutene precipitates at certain points in the autoclave.

EXAMPLE 1

The procedure of Comparative Example 1 is repeated except that the solvent used is cyclohexane rather than iso-octane. 42.5 g of polybut-1-ene are obtained and it is found that the reaction mixture is homogeneous with only traces of precipitated polymer.

It can thus be seen that the replacement of iso-octane by cyclohexane, an excellent solvent for polybut-1-ene, considerably increases the rate of polymerisation and the homogeneity.

COMPARATIVE EXAMPLE 2

205 g of pure but-1-ene and 3.5 g of titanium trichloride Stauffer AA are introduced into the autoclave described in Comparative Example 1. The mixture is then shaken for 19 hours, whilst keeping the temperature at 25° to 30° C. The but-1-ene is then allowed to evaporate when it is found that approximately 15 ml of liquid oligomers of but-1-ene having boiling points above 30° C. remain in the autoclave.

It can thus be seen that, under conditions similar to those which would obtain in a factory for injecting a suspension of $TiCl_3$ into but-1-ene monomer, the contact leads to the oligomerisation of approximately 5% of the but-1-ene.

The titanium trichloride (and the oligomers) are recovered by adding 200 ml of cyclohexane, shaking and heating at 60° C., because the contents of the autoclave are extremely sticky.

COMPARATIVE EXAMPLE 3

250 ml of cyclohexane, 2.5 millimols of diethylaluminium chloride and 1 millimol of the $TiCl_3$ recovered in Comparative Example 2 are introduced into a 500 ml glass flask equipped with a mechanical stirrer. But-1-ene is then polymerised in this medium under atmospheric pressure at 60° C. for 5 hours. The catalyst is deactivated by means of 10 ml of isopropanol and then the viscous solution is washed with water. On evaporating the cyclohexane, 6.2 g of a polybut-1-ene, 37% by weight of which is insoluble in boiling diethyl ether, are recovered. The catalytic activity is 8 g of polymer/g of $TiCl_3$.hour.

EXAMPLE 2

But-1-ene is polymerised under the conditions of Comparative Example 3 but using fresh $TiCl_3$ AA suspended in cyclohexane (the suspension optionally having been aged for one month). A polybut-1-ene is obtained 88% of which is insoluble in boiling diethyl ether. The catalytic activity is 24 g of polymer/g of $TiCl_3$.Hour.

Under these conditions, it is found that high activity and good stereospecificity are obtained due to the fact that prolonged contact between $TiCl_3$ and butene is avoided.

EXAMPLE 3

Polymerisation of but-1-ene is carried out continously in an autoclave of the type illustrated in the accompanying drawing. Referring to the drawing a reactor 1 is provided with a stirrer 2 and a double jacket 3. The reactor, the volume of which is 1,100 liters is equipped with an attachment 4, the dimensions of which are as follows:

height: 480 mm and
diameter: 100 mm.

The attachment 4 is provided with inlets 8 and 10, each of which is provided with a heating jacket 9 and 11, respectively. The reactor 1 is provided also with gas inlet and outlet 6 and 7 and an outlet for reaction product 5. A catalyst of the Ziegler-Natta type consisting of diethylaluminium chloride and violet titanium trichloride is used, the catalyst being modified by a trace of dimethylhydrazine, the effect of which is to increase the steric uniformity of the polymer. The molecular weight of the polymer produced is controlled by means of hydrogen.

The reagents are introduced to the reactor continuously in the following proportions:

but-1-ene: 104.5 l/hour
solvent recycled with the but-1-ene: 6.5 l/hour
$TiCl_3$ Stauffer AA: 0.065 mol/hour
alkyl-aluminium + dimethylhydrazine (DMH): 1.15 mol/hour
hydrogen: 2.35 mol/hour
solvent acting as carrier for the catalyst: 1.3 l/hour
total concentration of solvent in the but-1-ene: 9.06% by weight.

The reagents are introduced into the reactor in two groups:
reagents A: but-1-ene + alkyl-aluminium + DMH + hydrogen, and
reagents B: $TiCl_3$ + inert solvent.

The inert solvent is anhydrous methylcyclohexane (water content $\leq$ 10 ppm).

The butene used is at least 99% pure and is dried before being introduced into the reactor to a water content of at most 5 ppm.

The reagents A are introduced into reactor through inlet 10 and are heated with steam to the polymerisation temperature by means of the double jacket 11.

The reagents B are introduced into the reactor through inlet 8 and are heated with steam to the polymerisation temperature by means of the double jacket 9.

The polymerisation temperature is adjusted to 46° C. by means of cold water flowing in the double jacket 3. The pressure in the reactor is kept at 9.5 bars by a continuous gentle flow of anhydrous nitrogen through lines 6 and 7.

Polymer is removed through line 5 and, after evaporation of solvent and excess monomer, is washed with alcohol and then with water in order to deactivate and remove the catalyst residues. It is then dried.

The polymer obtained possesses the following characteristics:

isotacticity: 98.5% measured by extraction with boiling diethyl ether;
melt index (M.I.): 0.35, measured at 230° C. under a load of 2.160 kg; and
density (d): 0.9180, measured at 20° C.

By repeating the experiment in the absence of methylcyclohexane, the catalyst being introduced as a suspension in iso-octane, it is found after 1 hour that polybutene precipitates on the stirrer and that, 2 hours after, the outlet of the reactor is clogged by a polymer deposit.

EXAMPLE 4

A polymerisation is carried out in a 3 liter autoclave equipped with (i) a delivery tube which makes it possible to introduce the butene and the methylcyclohexane, and to keep it under a nitrogen atmosphere during the rinsing operations, (ii) two pressure locks, one of which is used to introduce the catalyst and the other (12 ml) the amount of hydrogen necessary to produce the desired partial pressure, and (iii) a valve at the bottom for emptying the apparatus.

A second 4 l autoclave is also provided for deactivation of the catalyst and washing. The apparatus is constantly kept under a nitrogen atmosphere after each operation and rinsed with hot methylcyclohexane.

0.5 l of dry degassed methylcyclohexane and then 2 l of but-1-ene are introduced with the reactor. The temperature is kept at 46° C. and 0.5 millimol of dimethylhydrazine, 26 millimols of diethylaluminium chloride and 0.7 millimol of TiCl$_3$. 1/3(AlCl$_3$) are injected in turn. The hydrogen pressure is increased to 40 bars. After 3 hours of polymerisation, 172 g of product are recovered, 98.5% of which is insoluble in boiling diethyl ether.

The other properties of this product are:

Density (d): 0.9203
Melting point (° C.): 134.5° C.
Melt index (M.I.): 0.21
Reduced viscosity (r$\eta$): 3.49

EXAMPLE 5

0.5 millimol of dimethylhydrazine followed by 26 millimols of diethyl-aluminium chloride dissolved in toluene and 0.7 millimol of TiCl$_3$. 1/3(AlCl$_3$) suspended in toluene are introduced into the same apparatus as used in Example 4, using the same procedure. The proportion of toluene in the mixture is 1%. After 3 hours of polymerisation, 210 g of product are recovered, 98.2% of which is insoluble in boiling diethyl ether.

The other properties of the polymer are:

Density (d): 0.912
Reduced viscosity (r$\eta$): 3.80.

EXAMPLE 6

Polymerisation is carried out in a 20 l autoclave equipped with the same devices for introducing the monomer, the catalyst and the hydrogen as the apparatus described in Example 4, and the same method of working is used. 4 l of methylcyclohexane and 8.9 kg of but-1-ene are introduced. The temperature is raised to 50° C. and then 2 millimols of dimethylhydrazine, 0.2 mol of diethylaluminium chloride and 7 millimols of TiCl$_3$. 1/3(AlCl$_3$) are introduced. The partial pressure of hydrogen in the reactor is 1 bar. After 3 hours of operation the valve in the bottom is opened and the polymer solution is passed into a 50 l autoclave where the catalyst is deactivated by means of propylene oxide and the product is then washed with water. Anti-oxidant is then added to the product. 1.5 kg of dry product are recovered, 97.5% of which is insoluble in boiling diethyl ether The other properties of the polymer are:

Density (d): 0.9233
Reduced viscosity (r$\eta$): 3.54.

EXAMPLE 7

The procedure of Example 3 was repeated, starting at 46° C. and lowering the temperature to 37° C. The polymerisation reaction was continued at 37° C. for 10 hours without difficulty, the concentration of polymer being 65 g/l under normal working conditions.

We claim:

1. In a process for the preparation of a polymer selected from the group consisting of but-1-ene homopolymers and copolymers of but-1-ene containing up to 15% by weight of units derived from at least one other α-olefin by the polymerization or copolymerization of but-1-ene in the presence of a sterospecific Ziegler-Natta catalyst and in a homogeneous reaction mixture, and at a temperature of from 35° to 55° C. the improvement which comprises introducing into the reaction mixture to avoid precipitation of the polymer during the course of the reaction from 1 to 30% by weight of at least one inert hydrocarbon solvent selected from the group consisting of benezene, toluene, xylene, cyclohexane and methylcyclohexane.

2. The process of claim 1, wherein the reaction is carried out continuously.

3. The process of claim 1, wherein at least some of said inert solvent is added to the reaction mixture in the form of a dispersion of a transition metal halogen compound in the inert solvent.

4. The process of claim 1 wherein but-1-ene is copolymerised with ethylene or propylene.

5. A process for the preparation of an isotactic polybut-1-ene by polymerizing but-1-ene in the presence of a catalyst comprising an organoaluminium compound and a titanium halogen compound in a homogeneous reaction mixture at a temperature of from 35° to 55° C., the improvement which comprises introducing into the reaction mixture to avoid precipitation of the polymer during the course of the reaction from 2 to 15% by weight of at least one inert hydrocarbon solvent selected from the group consisting of benzene, toluene, xylene, cyclohexane and methylcyclohexane.

* * * * *